Jan. 4, 1966  E. F. G. KLESPER ETAL  3,227,663
PROCESS FOR PRODUCING A TWO SET SIZE
CELL STRUCTURE POLYURETHANE FOAM
Filed Jan. 19, 1961

INVENTORS
ERNST F. G. KLESPER
BY ROLAND N. FRACALOSSI
ATTORNEYS

United States Patent Office 3,227,663
Patented Jan. 4, 1966

3,227,663
PROCESS FOR PRODUCING A TWO SET SIZE CELL STRUCTURE POLYURETHANE FOAM
Ernst F. G. Klesper and Roland N. Fracalossi, Baltimore, Md., assignors to Wm. T. Burnett & Co., Incorporated, Baltimore, Md., a corporation of Maryland
Filed Jan. 19, 1961, Ser. No. 83,847
2 Claims. (Cl. 260—2.5)

This invention relates to a process for producing polyurethane foams of controlled cell size and more particularly to such foams in which the cells are of substantially two sizes only, the cells in each size being substantially uniform in character, to compositions and methods for making the said foams and to other matters in connection therewith.

The methods and apparatus for making flexible polyurethane foams of polyester are well known. Generally, polyesters of an approximate molecular weight of 1000–3000 made from saturated dibasic acids like adipic acid and polyols such as diethyleneglycol and trimethylolpropane are mixed in a high speed mixing device with an aromatic diisocyanate. Water, a suitable catalyst and emulsifiers are also added. The mixture starts to foam soon after discharge and sets to a solid porous mass in a short period of time. For references on the prior art see: August Hoechtlen, Kuenstliche Schwaemme, German Patent No. 860,109; Eli Simon and Frank W. Thomas, "Cellular Foamed Alkyd-Diisocyanate Resins" U.S. Patent No. 2,602,783; Simon and Thomas, "Cellular Plastics Containing Saturated and Unsaturated Polyester Resin" U.S. Patent No. 2,642,403; P. Hoppe et al, "Process and Apparatus for the manufacture of Polyurethane Plastics," U.S. Patent No. 2,764,565 and Simon and Thomas, "Resilient Cellular Resin Products" U.S. Patent No. 2,772,245.

Control of cell size and distribution of cells in the foamed product could not be maintained in certain developments in the prior art where, for example, substantially two sizes only of cells of substantially different size in controlled distribution in the finished foam was not feasible in prior art processes. With prior art no such two size cell structure could be satisfactorily obtained. Usually the foams were built up of cells of approximately the same size. However, in some instances a two size cell structure only of inferior appearance, could be obtained. The methods which have been proposed so far for this purpose were centered around two approaches: The first and oldest was to mix particles into the polyester before foaming. These particles were of such a nature as to produce large cells by destroying an area of the original small cells immediately adjacent to the particles, to produce a sponge like structure. An example of this is illustrated by beeswax or other waxlike material which was ground to a certain particle size and added to the polyester resin in such a quantity as to give the desired size and number of large cells. This process suffered from the cumbersome preparation and sieving of the particles because of their waxlike consistency. Another drawback was that the particles had to be pre-mixed with the polyester resin to prepare a master batch. The resulting foam did not have uniformly large cells since the particles tended to agglomerate and the cells were of irregular sizes.

The second method of the prior art depended on the action of glycerine in the foaming mixture. The glycerine was fed into the mixing chamber pre-mixed with water, catalyst and emulsifier. When added in proper amounts a foam with essentially spherical large cells was produced. The background of this foam was quite irregular. The foams were considerably stiffer than without the glycerine because of the additional crosslinking caused by this triol.

Among the objects of the present invention is the production of foam possessing a substantially two size cell structure. Another object is to produce foams of greater uniformity in this particular cell structure, that is, foams comprised of uniformly sized large cells substantially evenly distributed among a background of uniformly sized small cells. A still further object is the production of a substantially two size cell only foam, in which the larger cell is elongated, oval-like in structure.

Further objects will appear from the more detailed description given below by way of illustration, but without limitation other than as indicated since various changes may be made by those skilled in the art.

Figure 1:
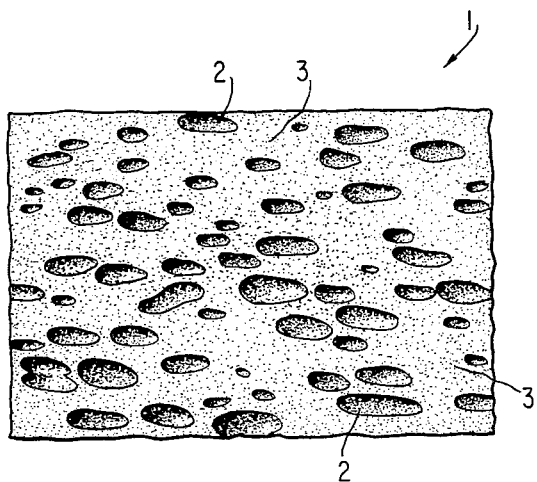
FIGURE 1 is an elevational view of part of a block of material made in accordance with the invention.
Figure 2:
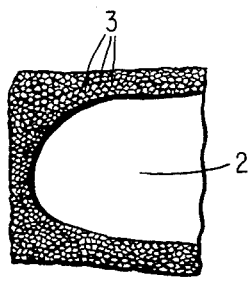
FIGURE 2 is an enlarged fragmentary sectional view thereof.

This invention is concerned with flexible polyurethane foams of polyester, aromatic diisocyanate, and more specifically with polyurethane foams illustrated by adipic acid-diethyleneglycol polyester and tolylene diisocyanate, the latter being the system most generally employed. Still more specifically we deal here with polyurethane foam which is characterized by a particular cell structure comprised of cells of two distinct sizes each of which is fairly uniform in shape and volume. The smaller of the two are more numerous and form a uniform "background" in which the larger, less numerous cells are uniformly distributed, creating a structure not unlike a natural sponge. It is desirable that the larger type cell be of elongated shape as illustrated in the drawing. The smaller background cells may desirably be quite small, say, for example, from 0.2 to 1.0 mm. and the larger cells very distinctively larger, say a ratio of at least 10 between the longer axis of the average large cell and the diameter of the average small cell.

In accordance with this invention, it has been found that controlled foams of substantially two size cell only structure may be produced from any of the foaming polyester aromatic diisocyanate compostions available on the market by carrying out the foaming of such compositions by any polyurethane foam catalyst, many varieties being available, and well known in the prior art, in the presence of a tertiary amine having at least ten carbon atoms and a fatty acid of at least twelve atoms.

The fatty acid component may be a monocarboxylic acid of the fatty acid series like stearic acid and other such saturated acids, individually or in admixture. Examples of suitable fatty acids are: lauric, myristic, palmitic, stearic, and the commercial mixtures such as of palmitic with stearic acid, or the acid mixtures from fats and oils such as cocoanut oil acids. The term "coco acids" refers to fatty acids from coconut oil consisting chiefly of lauric acid and myristic acid. The effectiveness increases with increasing chain length, lauric acid being about at the lower limit. Unsaturated liquid fatty acids like oleic and linoleic acid are not suitable.

A variety of tertiary amines may be employed alone or in admixture to carry out the invention including tributylamine, dimethylcocoamine, N-cocomorpholine, dimethylstearylamine and triisooctylamine in increasing order of effectiveness. The tertiary amine component should have at least 10 carbon atoms in the molecule to be sufficiently active.

The acids or tertiary amines by themselves gave no effect. The fatty acid component is conveniently dissolved in a catalyst for the reaction such as N-ethylmorpholine or diethylethanolamine. These latter two substances illustrate catalysts which are widely used in urethane foams. The tertiary amine component, being liquid, is preferably fed undiluted, or in admixture with the activator which consists of catalyst, water and emulsifier. The exact amounts used vary with the particular ingredients employed which fact will be illustrated by the examples given below. The preferred amounts are 0.3 to 1.5% of either fatty acid or tertiary amine based on the total composition.

The following examples illustrate the invention. Parts are by weight unless otherwise indicated.

EXAMPLE I

The materials used in this formulation were: (1) A polyester made from adipic acid, diethyleneglycol and a small amount of trimethylolpropane the polyester being of approximately 2000 molecular weight, having a hydroxyl number of about 45, an acid number of less than 1.5, and a water content of less than 0.1%, with a viscosity between 700–850 centipoise at 73° C. This polyester is available under the trade name of "Multron R 68." (2) Tolylene diisocyanate isomer mixture comprised of approximately 80% of the 2,4 and 20% of the 2,6 isomer. This diisocyanate is widely available, e.g., under the trade name of "Mondur TD 80" or under the trade name "Hylene TM." (3) An activator consisting of a mixture of (a) N-ethylmorpholine, (b) "additive 3," (emulsifier: ammonium salt of ricinoleic acid), (c) "Witco 77–86" (emulsifier: blend of polyalcohol—polycarboxylic acid ester and sulfonated castor oil). (d) water. (4) Dimethylstearylamine. (5) A solution of stearic acid in an equal weight of N-ethylmorpholine.

The materials in this and other examples are desirably fed and metered separately in liquid condition, thus giving better control and ease of handling.

The equipment used for metering and mixing may be of the general high pressure injector type described in its essentials by P. Hoppe et al., U.S. Patent No. 2,764,565. The mixing chamber of the machine used for the present examples had the dimensions 40 x 100 mm. and was of the usual cylindrical shape whose axis has the longer dimensions. The actual mixing was accomplished by an 11 pin stirrer rotating inside the cylinder at a speed of about 3500 r.p.m. The temperature of the materials before entering the mixing chamber was kept close to 25° C. The mixture starts foaming shortly after leaving the chamber and subsequently forms the two size cell structure during rise.

The components were as follows:

100 parts "Multon R 68"
49.4 parts "Mondur TD 80"
 0.6 part Dimethylstarylamine
 1.0 part Stearic acid, N-ethylmorpholine (1:1 by weight)
 7.0 parts Activator consisting of:
   1.5 parts N-ethylmorpholine
   0.8 part "Additive 3"
   0.8 part "Witco 77–86"
   3.9 parts Water
   ___
   7.0 parts Total In the following examples, other mixtures and compositions are given, which may be converted into foams by methods analogous to those used as set forth in Example I.

EXAMPLE II

In this example, the "polyester R 68" of Example I was replaced by "polyester PFR–4." This polyester "PFR–4" is made conventionally from adipic acid, diethyleneglycol and small amounts of trimethylolpropane, has a hydroxyl number of 55 to 62, an acid number of 1 to 2, and a viscosity of 8000 to 10,000 at 25° C.

The components were as follows:

100 parts "Polyester PFR–4"
51.5 parts Tolylene diisocyanate
 2.0 parts Stearic acid, N-ethylmorpholine (1:1 by weight)
 8.04 parts Activator, consisting of:
   1.5 parts N-ethylmorpholine
   0.6 part Dimethylstearylamine
   0.8 part "Additive 3"
   0.8 part "Witco 77–86"
   3.3 parts Water
   1.0 part Water—Dispersed pigment (60% water) YW 613 yellow paste
   0.02 part PV-Echt-Orange GRL
   0.02 part Poviac Black 2013 (50% water)
   ___
   8.04 parts Total

EXAMPLE III

In this example the dimethylstearylamine was not fed into the mixing chamber separately but pre-mixed with the activator as shown below:

The components were as follows:

100 parts "Polyester R 68"
49.4 parts "Tolylene diisocyanate TD–80"
 0.8 part Stearic acid, N-ethylmorpholine (1:1 by weight)
 7.6 parts Activator, consisting of:
   1.5 parts N-ethylmorpholine
   0.8 part "Additive 3"
   0.8 part "Witco 77–86"
   3.9 parts Water
   0.6 part Dimethylstearylamine
   ___
   7.6 parts Total

EXAMPLE IV

The tertiary amine component in this example is represented by N-cocomorpholine replacing dimethylstearylamine. N-cocomorpholine is chiefly N-lauryl myristyl morpholine.

The components were as follows:

100 parts "Polyester R 68"
49.3 parts Tolylene diisocyanate
 1.3 parts Stearic acid, N-ethylmorpholine (1:1 by weight)
 8.5 parts Activator, consisting of:
   1.5 parts N-ethylmorpholine
   1.5 parts N-cocomorpholine
   0.8 part "Additive 3"
   0.8 part "Witco 77–86"
   3.9 parts Water
   ___
   8.5 parts Total

EXAMPLE V

The tertiary amine component is triisooctylamine.
The components are as follows:

100 parts "Polyester R 68"
49.3 parts Tolylene diisocyanate "TD 80"
 1.0 part Stearic acid, N-ethylmorpholine (1:1 by weight)
 0.6 part Triisooctylamine
 7.0 parts Activator, consisting of:
   1.5 parts N-ethylmorpholine
   0.8 part "Additive 3"
   0.8 part "Witco 77–86"
   3.9 parts Water
   ___
   7.0 parts Total

EXAMPLE VI

The tertiary amine component is dimethylstearylamine and the fatty acid component is palmitic acid.
The components are as follows:

100 parts "Polyester R 68"
49.4 parts "Tolylene diisocyanate TD 80"

1.0 part Palmitic acid, N-ethylmorpholine (1:1 by weight)
1.2 parts Dimethylstearylamine
7.0 parts Activator, consisting of:
  1.5 parts N-ethylmorpholine
  0.8 part "Additive 3"
  0.8 part "Witco 77–86"
  3.9 parts Water
  ———
  7.0 parts Total

EXAMPLE VII

The fatty acid component is myristic acid.
The components were as follows:

100 parts "Polyester R 68"
49.4 parts "Tolylene diisocyanate TD 80"
3.0 parts Myristic acid, N-ethylmorpholine (1:1 by weight)
0.6 part Dimethylstearylamine
7.0 parts Activator, consisting of:
  1.5 parts N-ethylmorpholine
  0.8 part "Additive 3"
  0.8 part "Witco 77–86"
  3.9 parts Water
  ———
  7.0 parts Total

EXAMPLE VIII

A different catalyst is used, N-ethylmorpholine is replaced by diethylethanolamine.
The components are as follows:

100 parts "Polyester R 68"
49.4 parts "Tolylene diisocyanate TD 80"
1.0 part Stearic acid, diethylethanolamine (1:1 by weight)
0.6 part Dimethylstearylamine
6.5 parts Activator, consisting of:
  1.0 part Diethylethanolamine
  0.8 part "Additive 3"
  0.8 part "Witco 77–86"
  3.9 parts Water
  ———
  6.5 parts Total

EXAMPLE IX

A different emulsifier is used, "Additive 3" and "Witco 77–86" being replaced by "Emulphor 719." This emulsifier is a polyoxyethylated vegetable oil.
The components are as follows:

100 parts "Polyester R 68"
49.4 parts "Tolylene diisocyanate TD 80"
1.5 parts Stearic acid, N-ethylmorpholine (1:1 by weight)
0.6 part Dimethylstearyl amine
7.4 parts Activator, consisting of:
  1.5 parts N-ethylmorpholine
  2.0 parts "Emulphor 719"
  3.9 parts Water
  ———
  7.4 parts Total The foams of all the examples had oval shaped, large cells and had approximately the same appearance as far as the size and shape of the cells was concerned. The foams of Example I had a large cell whose longer axis was about 3 times that of the shorter axis, the longer axis being 10 mm. on the average and the shorter axis 3 mm. on the average. The small spherical "background" cells had a diameter of 0.4 mm. ±0.1 mm.

The described two size cell structure renders the foams more suitable for various purposes, i.e., for sponges since the water absorption and the abrasive action are greater than for one cell size foams, or for filtering purposes where the greater surface prevents clogging by solids.

Without any limitation, the cause of the formation of the two size cell structure is thought to be due to the formation of an additional phase dispersed in the main mixture. This phase forms either during mixing in the mixing chamber or shortly thereafter. It appears that insolubility of the tertiary amine and fatty acid components in the polyester may be necessary for the formation of this phase. The formation of a large cell forming phase is indicated among other things by the observation that the large cells show a color in their cell walls which is different from the rest of the foam. The formation of an additional phase in the forming mixture as opposed to the introduction of an additional phase as such capable of forming large cells, is a unique phenomenon.

The drawing illustrates the products obtained from the examples. The block 1 shows at 2, the larger oval cells while at 3 the "background" cells are shown. A substantially uniform pattern of distribution of the larger cells within the background cells is generally indicated.

What we claim is:

1. A process for producing a two set size cell structure in polyurethane flexible foam including forming and foaming a foamable composition of a polyester condensation product of dicarboxylic acid and dihydric alcohol, having a hydroxyl number of 35 to 70, an acid number of less than 2, and an average molecular weight of 1500 to 2500, aromatic diisocyanate, water, liquid polyurethane foam emulsifier, and liquid polyurethane foam catalyst, to produce flexible polyester polyurethane foam, with an amount introduced separately from each other of about 0.3 to 1.5% of each by weight on the total composition of a tertiary amine containing at least 10 carbon atoms and a saturated fatty acid of at least 12 carbon atoms, to give a foam comprised of larger cells randomly distributed in a background mass of cellular cells, the larger cells being oval in shape, the larger as well as the smaller cells being of similar size within each set, wherein the fatty acid is dissolved in a catalyst N-ethylmorpholine for the reaction.

2. A process for producing a two set size cell structure in polyurethane flexible foam including forming and foaming a foamable composition of a polyester condensation product of dicarboxylic acid and dihydric alcohol, having a hydroxyl number of 35 to 70, an acid number of less than 2, and an average molecular weight of 1500 to 2500, aromatic diisocyanate, water, liquid polyurethane foam emulsifier, and liquid polyurethane foam catalyst, to produce flexible polyester polyurethane foam, with an amount introduced separately from each other of about 0.3 to 1.5% of each by weight on the total composition of a tertiary amine containing at least 10 carbon atoms and a saturated fatty acid of at least 12 carbon atoms, to give a foam comprised of larger cells randomly distributed in a background mass of cellular cells, the larger cells being oval in shape, the larger as well as the smaller cells being of similar size within each set, wherein the fatty acid is dissolved in a catalyst diethyl ethanolamine for the reaction.

References Cited by the Examiner

UNITED STATES PATENTS

| 2,981,700 | 4/1961 | Parker et al. | 260—2.5 |
| 3,002,937 | 10/1961 | Parker et al. | 260—2.5 |

FOREIGN PATENTS

| 214,810 | 5/1958 | Australia. |
| 852,379 | 10/1960 | Great Britain. |

LEON J. BERCOVITZ, *Primary Examiner.*

D. ARNOLD, *Examiner.*